Aug. 3, 1965  O. KAUP  3,198,278
FRAME FOR A FORK LIFTING VEHICLE
Filed Sept. 6, 1962  6 Sheets-Sheet 4

Inventor
OTMAR KAUP

By Toulmin & Toulmin
Attorneys

Aug. 3, 1965     O. KAUP     3,198,278
FRAME FOR A FORK LIFTING VEHICLE

Filed Sept. 6, 1962     6 Sheets-Sheet 5

Inventor
OTMAR KAUP

By Toulmin & Toulmin
Attorneys

United States Patent Office 3,198,278
Patented Aug. 3, 1965

3,198,278
FRAME FOR A FORK LIFTING VEHICLE
Otmar Kaup, Aschaffenburg, Germany, assignor to Gesellschaft für Linde's Eismaschinen Aktiengesellschaft, Hollriegelskreuth, Munich, Germany
Filed Sept. 6, 1962, Ser. No. 221,916
Claims priority, application Germany, Dec. 4, 1959, G 28,509
4 Claims. (Cl. 180—54)

The present invention relates to an industrial lift truck, more particularly to an improved frame for a fork-lifting truck driven by an internal combustion engine and employing a hydraulic transmission.

This application is a continuation-in-part of the application Ser. No. 73,329, filed on December 2, 1960, now abandoned, by the same named inventor.

The known-fork-lifting trucks comprise either a frame supporting the remaining structure of the vehicle or several building blocks which are assembled and directly transmit all forces to the wheels. The latter structure has been used with fork-lifting trucks having a mechanical transmission. It has, however, also been employed with fork-lifting trucks having a hydraulic transmission, since the block building construction is generally considered as superior to the frame type of construction.

While a building block type of construction has definite advantages when applied to fork-lifting trucks with mechanical transmission, it is believed that serious disadvantages arise if this type of construction is applied to lifting trucks with hydraulic transmission means. For general maintenance work on vehicles of all kinds, and especially on much used commercial vehicles for industrial use it is necessary to so position the individual hydraulic elements, such as a control pump, the oil motors, the control members and so forth, that they will be readily accessible for inspection and servicing and that they can be easily removed from the vehicle without requiring a complete disassembly of the lift truck. All these disadvantages are naturally outweighed by the great advantages of a hydraulic transmission, and it therefore is highly desirable to provide a construction of a hydraulically operated lifting truck so that the lift truck can be comparatively easily assembled and serviced.

It is therefore the principal object of the present invention to provide a novel and improved industrial lift truck.

It is another object of the present invention to provide a fork-lift truck which is driven by an internal combustion engine and employs a hydraulic transmission with the frame construction being such that the lift truck can be easily assembled and the various operating components are readily accessible to facilitate serving thereof.

The present invention is based on the consideration that it is advantageous to abandon the conventional block building type of construction as applied to fork-lifting trucks with hydraulic transmission and to employ instead an entirely new type of construction. According to this invention, the lifting truck essentially comprises a pair of box-shaped elongated carriers having high inner side walls with each carrier having at both ends a wheel box forming an integral structure with the carriers. A shaft upon which the lifting mast is supported connects the carriers and spaces them at one of their respective ends in a determined, widely spaced relationship. A counterbalancing weight connects the carriers at their respective other ends in a determined, more narrowly spaced relationship. The more widely spaced ends of the carriers rest on an axle housing constituting the bearing for the driving wheels and housing the hydraulic driving transmission and control means. A longitudinally extending intermediate casing is provided between the internal combustion engine and the axle housing. The intermediate casing has lateral walls connected with the carriers, a front flange portion connected with the axle housing, and a rear flange portion connected with the fly wheel casing. The intermediate casing housing a driving shaft driven by the internal combustion engine and operatively connected with the control pump in the axle housing.

Other objects and advantages of the present invention will be apparent upon reference to the accompanying description when taken in conjunction with the following drawings, wherein.

With reference to the drawings wherein like reference symbols indicate the same parts throughout the various views a specific embodiment of the invention will be described in detail.

Figure 1:
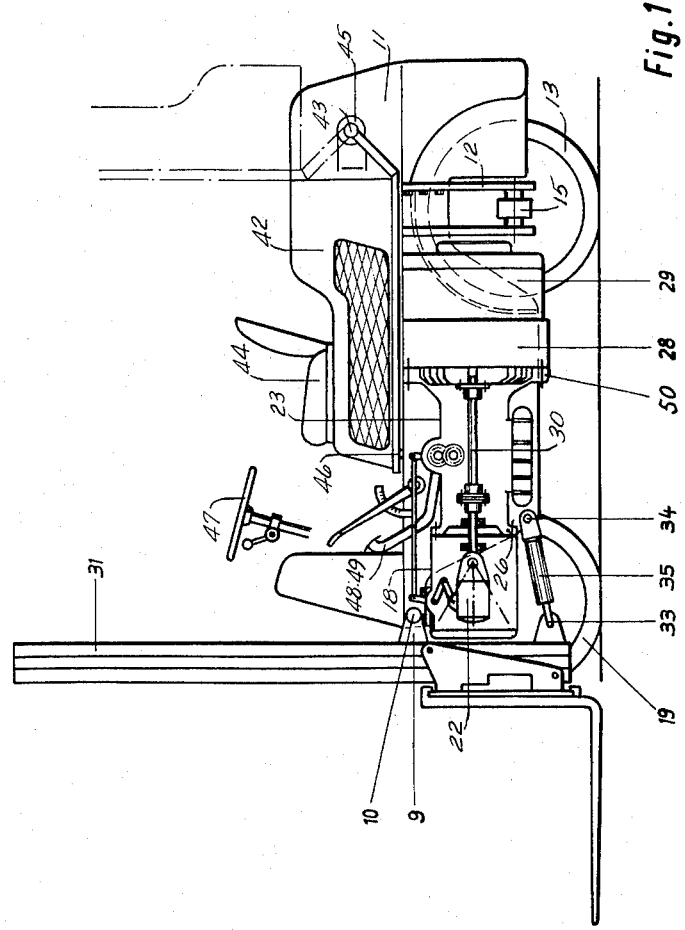
FIGURE 1 is a side-elevational view of the fork-lift truck of the present invention.
Figure 2:
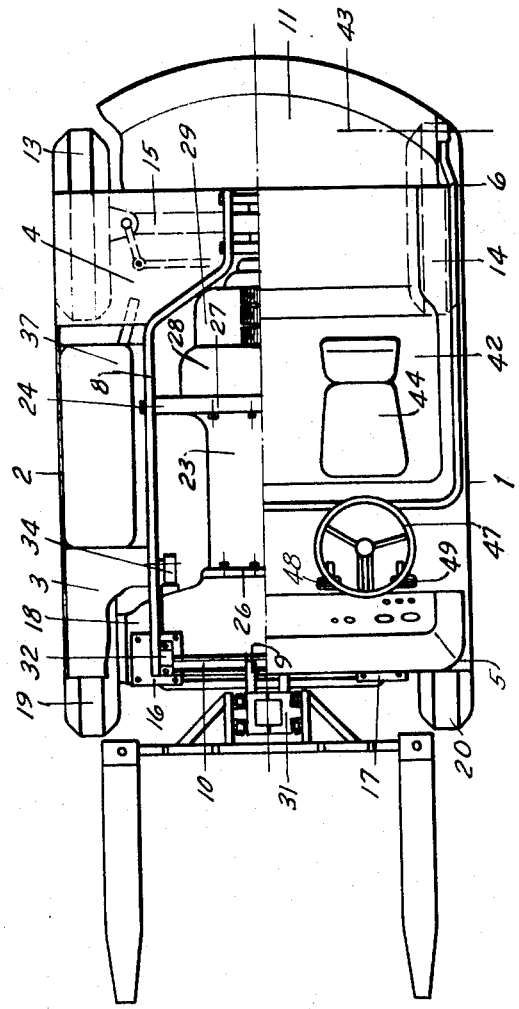
FIGURE 2 is a top plan view of the lift-truck of FIGURE 1, and partially in horizontal section.
Figure 3:
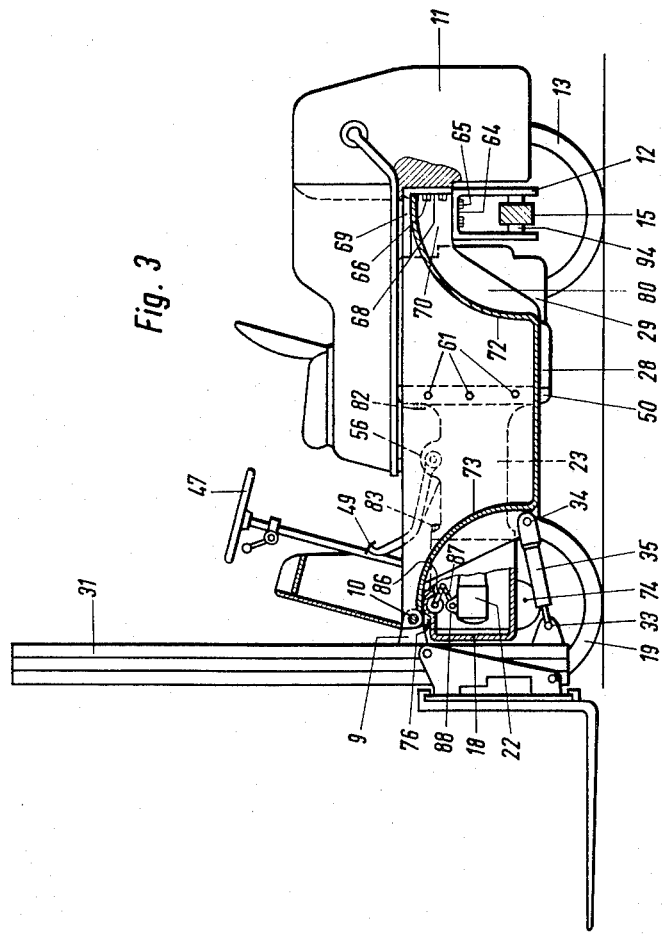
FIGURE 3 is a side-elevational view similar to that of FIGURE 1 but having a section at the level of the frame in a plane parallel to the central plane of the vehicle intermediate the inner and outer side walls of the frame with a portion of the axle housing also being shown in section.
Figure 4:
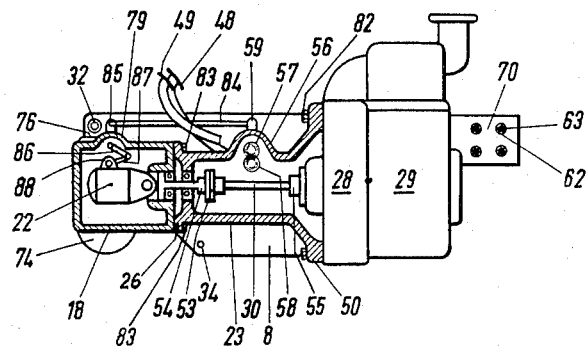
FIGURE 4 is a longitudinal sectional view of a portion of the intermediate casing with the engine and the fly wheel casing not being shown in section.

With particular reference to FIGURES 1–3, the fork-lift truck of the present invention comprises two box-shaped longitudinal carriers 1 and 2 which are substantially parallel to each other and which have at both ends thereof wheel boxes 3, 4 and 5, 6. The longitudinally extending carriers 1 and 2 are provided with high inner side walls 7 and 8 and are spaced apart a comparatively wide distance at one end by the shaft 10 which is supported in journals 32 mounted on the inner side walls 7 and 8. The shaft 10 pivotally supports a lifting mast 31 which is connected to the shaft by brackets 9.

The other ends of the inner walls 7 and 8 are bent inwardly to form oblique portions 80 with the extreme ends then bent outwardly to form parallel portions 70 which are spaced considerably closer together than the other ends of the inner walls 7 and 8. Four spacer tubes 62 are welded between the end portions 70 with bolts 63 passing through the tubes so that the end portions are interconnected by the screw bolts and are maintained a predetermined distance apart by the spacer tubes 62.

At the rear end of the frame, as indicated by the closely spaced end portions 70, there is mounted an axle carrier 12 within which is supported an axle 15 having steerable wheels 13 and 14 mounted thereon.

The front or widely spaced ends of the carrier side walls 7 and 8 have flanges 16 and 17 thereon which rest upon seats or countersurfaces 76 of an axle housing 18.

Figure 7:
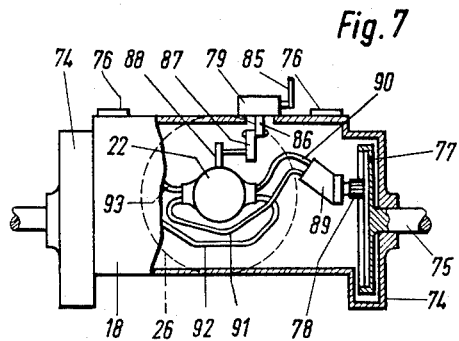
FIGURE 7 is a front elevational view of the front axle housing with a portion of the housing being shown in section.
Figure 8:
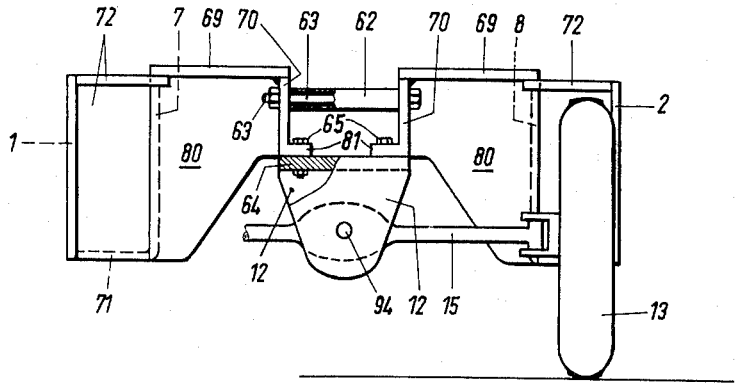
FIGURE 8 is a rear-elevational view of the fork-lift truck of FIGURE 1 with certain parts omitted and certain parts broken away.

The ends of the axle housing 18 are provided with enlarged portions 74 (see FIG. 7) from which extend spindles 75 upon which driving wheels 19 and 20 are mounted. The inner end of the spindle 75 is provided with an internal gear 77 which meshes with a gear 78 driven by a hydraulic motor also enclosed in the housing 18.

Also included in the axle housing 18 is a hydraulic control pump 22 for converting mechanical energy into hydraulic energy which is then transmitted to the hydraulic driving means such as hydraulic motors in a known manner.

A longitudinal extending intermediate casing 23 is positioned within the center of the frame as described above and is provided at one end thereof with a flange 50 which is connected to the inner side walls 7 and 8 by bolts 61. The intermediate casing is also provided with a front flange 26 which is connected with the axle housing 18 by bolts 83. The rear flange 50 is connected with the fly wheel casing 28 of an internal combustion engine 29 by bolts 82 in such a manner that the engine is supported by the flange 50. An intermediate driving shaft 30 extending from the engine 29 is positioned in the intermediate casing 23 and is connected with the control pump 22.

The lifting mast 31 is tiltable in a vertical plane due to the action of hydraulic cylinders 35 which are pivotally mounted on the inner side walls 7 and 8 at 34 and at the lifting mast at 33.

The central portion of the longitudinally extending carrier 2, as indicated at 36, is located between the wheel boxes 3 and 4 and houses an exhaust gas purifier 37. While not shown in the drawings, in the corresponding central portion of the other carrier 1 there may be mounted a tool box, a battery, a reservoir for the hydraulic pressure medium and other accessories for operation of the lift truck.

Figure 5:
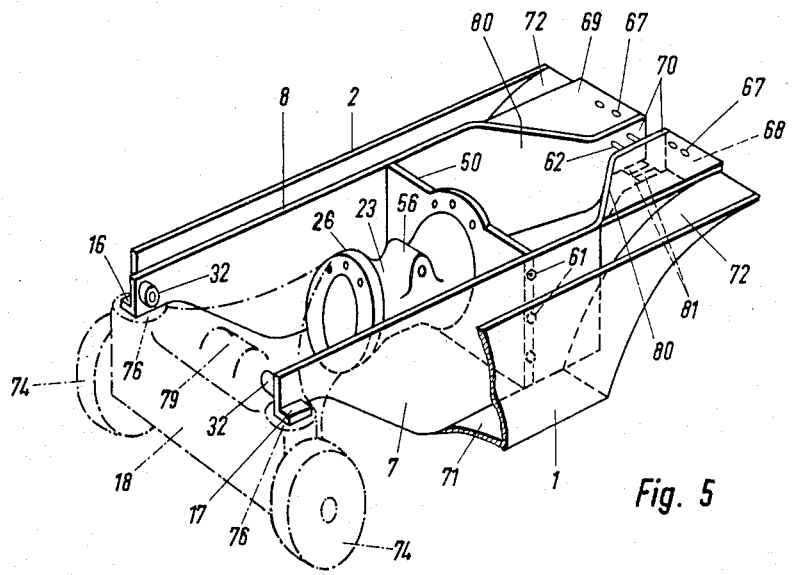
FIGURE 5 is an overall perspective view of the frame.

With particular reference to FIGURE 5, the structure of the frame of the lift truck will be described in greater detail.

Figure 6:
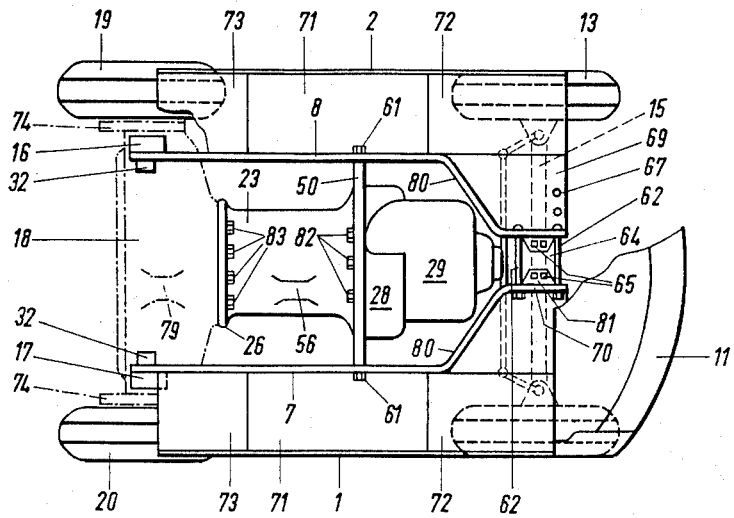
FIGURE 6 is a top plan view of the frame as illustrated in FIGURE 5 with the internal combustion engine added.

Below the rear end portion 70 of the side walls 7 and 8 there is mounted a carrier plate 64 which is connected with an angle iron 81 by bolts 65. The angle irons 81 are welded to the end portions 70 as may be seen in FIGURE 6.

Connecting walls 68 extend outwardly from the end portion 70 in a vertical plane. The counterbalancing weight 11 is attached to the connecting walls 68 by bolts 66. Carrier plates 69 extend in the horizontal plane from the oblique portions 80 and the end portions 70 of the side walls 7 and 8. The counter-balance weight 11 is also attached to the carrier plates 69 by bolts passing through holes 67 formed therein. The counterweight 11 is formed so as to project forwardly over the carrier plate 69 in the manner as may be seen in FIGURE 3.

Each of the carriers 1 and 2 is provided with bottom portions 71 which extend between the inner and outer side walls thereof. These bottom portions 71 terminate in the front of the truck in fender-like portion 73 and in the rear of the truck by fender-like portion 72 which define the wheel boxes 3, 4, 5 and 6 respectively.

The internal combustion engine 29 can be removed from the truck merely by removing the bolts 82. Sufficient space is provided between the inner side walls 7, 8 and particularly between the oblique portions 80 thereof, so that the engine is readily accessible when mounted within the frame.

Intermediate casing 23 is provided in the top portion thereof with an enlarged portion 56 in which meshing gears 57 and 58 are journalled.

The gear 58 is operatively connected with a foot pedal 48 and the gear 57 is operatively connected with a foot pedal 49 and a lever 59. A connecting rod 84 is pivotally connected to the lever 59 and has its other end connected to a lever 85 which is journalled on an enlarged portion 79 formed on the axle housing 18. When the foot pedal 49 is depressed, the foot pedal 48 will automatically move upwardly and vice versa resulting in the truck moving either forward or backward depending on which foot pedal is depressed. By means of the lever 59 and the connecting rod 84 the lever 59 is actuated correspondingly.

The intermediate casing 23 is provided with a single shaft 30 which is operatively connected with a drive shaft 54 by a clutch 53 and with the crankshaft of the internal combustion engine 29 by a clutch or coupling 55.

To further facilitate removal of the engine 29 the coupling 55 may merely comprise a spline connection so that no separate disconnecting operation is necessary at this point for removal of the engine.

As a result, since the intermediate casing 23 contains only the above mentioned parts, does not contain any parts which require frequent maintenance and access to the casing. All the structure within the intermediate casing 23 is readily accessible. This intermediate housing therefore serves only to bridge over the distance from the axle housing 18 to the engine 29, whereby a closed transmission line for the turning moment will be maintained. The power from the engine 29 is transmitted by the shaft 30 to the pump 22. The turning moment which the pump exerts upon its supports is transmitted to the housing 18 which transmits it back again to the motor 29 so that here we have a completely closed circuit for the turning moment without the necessity of backing up this moment against the vehicle frame.

The lift truck is also provided with a hood 42 which extends transversely over the upper surfaces of the carries 1 and 2 and longitudinally over and from the counterweight 11 to and over the engine 29. The hood can be pivoted upwardly and rearwardly about a horizontally positioned shaft 43 so as to permit access to that portion of the truck covered by the hood. A seat 44 is mounted upon the hood. The pivoting weight of the hood 42 is compensated by resilient pretensioned metal rubber bushings 45 mounted about the transverse shaft 43. The outer end portion of the hood rests upon rubber bumpers 46 mounted on the upper surfaces of the carries 1 and 2.

One advantage of the lift truck of the present invention is the extremely favorable distribution of weight. As a result of the long intermediate casing 23, the relatively heavy internal combustion engine 29 is positioned relatively far rearwardly and limited only by the pivoting movement of the wheels necessary for steering so that the weight of the engine cooperates with the weight of the counterweight 11.

In addition, this construction provides a favorable transmission of forces from the lifting mast 31 when a load is supported thereon down to the wheels of the truck. Vertical forces of the load are transmitted from the mast 31 through the brackets 9 to shaft 10 and from there to brackets 32 and to the inner side walls 7 and 8. Since the flanges 16 and 17 are substantially adjacent brackets 32, the path of forces through the inner side walls is a comparatively short one. In addition, the flanges 17 and 16 are closely adjacent the wheels 19 and 20 so that only the exterior portions of the axle housing 18 transmit such forces. This greatly reduces the bending forces applied to the axle housing 18. These bending forces are further reduced by the weight of the internal combustion engine 29 acting through the intermediate casing 23 and the rear flange 50. Since the load carried by the lifting mast 31 is positioned in front of shaft 10, the torque transmitted to carriers 1 and 2 is counteracted by the hydraulic cylinders 35. This torque is balanced by the counter weight 11 so that a bending moment is absorbed by the height of the side walls 7 and 8 and the box-shaped cross section of the carriers 1 and 2. Thus the various casings and housings such as the axle housing and intermediate casing are not subjected to any substantial bending moments.

Since the shaft 10 which supports the lifting mast is positioned somewhat above the center of the front wheels 19 and 20, and below the upper surface of the carriers 1 and 2 the hydraulic cylinder 35 is advantageously located between the lower portions of the inner side walls 7 and 8.

The entire structure of the industrial truck as described above results in a lift truck which is readily accessible for servicing and repairing purposes. The engine 29 is readily accessible merely by pivoting the hood 42 into the position indicated by the dot-dash lines in FIGURE 1. By removing the bolts 82 on the fly wheel casing 28 the entire engine 29 can be removed from the truck. In a similar manner the hydraulic system is readily accessible and removable by unlocking the brackets 9 and tilting the lifting mast 31 in a forward direction away from the truck. The longitudinal carriers 1 and 2 are then placed upon a stationary supporting block and the flanges 16 and 17 disconnected from the axle housing 18 so that the entire axle housing which contains substantially the entire hydraulic system can then be withdrawn in a direction forwardly of the lift truck frame.

Bending moments produced by the weight of the engine on the truck are not transmitted to the longitudinally extending carriers 1 and 2 since these bending moments are transmitted through rear flange 50, intermediate casing 23, flange 26 and the front axle housing 18. Thus, the frame is subjected virtually solely to vertical stresses which produced bending moments in the plane parallel to the section shown in FIGURE 1.

It will be understood that this invention is susceptible to modifications in order to adapt it to different usages and conditions and, accordingly, it is desired to comprehend such modifications within this invention as may fall within the scope of the appended claims.

I claim:

1. A lift truck comprising a pair of box-shaped longitudinally extending carriers having high inner side walls, and intermediate casing having a flange on one end thereof with said flange being connected between and secured to said inner side walls, the rear ends of said inner walls being positioned toward each other, a counterweight mounted on the rear ends of said side walls, means for mounting and supporting an engine on said intermediate casing flange, and an axle housing connected to the other end of said intermediate casing and extending laterally under the front ends of said inner side walls with said front ends resting upon said housing so as to be supported thereby.

2. A lift truck comprising a pair of spaced box-shaped longitudinally extending carriers having high inner side walls with said inner side walls having front and rear ends, a shaft mounted between the front ends of said inner side walls, said shaft adapted to pivotally support a hydraulic cylinder tiltable lifting mast, the rear portions of said inner side walls being positioned so that the rear ends thereof are parallel to each other and considerably closer to each other than the remaining portions of said inner side walls, means between the extreme rear ends of said inner side walls for maintaining rear ends a fixed distance apart, a counterweight mounted on the rear ends of said side walls, an intermediate casing having a flange on one end thereof with said flange being connected between the central portions of said inner side walls, means for mounting and supporting an engine on said intermediate casing flange, and an axle and transmission housing connected to the other end of said intermediate casing and extending laterally under the front ends of said inner side walls with said front ends resting upon said housing so as to be supported thereby, said intermediate casing adapted to receive a transmission shaft extending from said means for mounting and supporting an engine to said housing.

3. A lift truck comprising a pair of spaced longitudinally extending carriers having front and rear ends, a shaft mounted between the front ends, said shaft adapted to pivotally support a lifting mast, a counterweight mounted on the read ends of said side walls, an intermediate casing having a flange on the rear end thereof, said flange extending between and rigidly connected to the central portions of said side walls, means for mounting and supporting an enging on said intermediate casing flanges, and an axle and transmission housing secured to the front end of said intermediate casing and extending laterally under the front ends of said side walls with said front ends resting upon said housing so as to be supported thereby.

4. A lift truck comprising a pair of spaced box-shaped longitudinally extending carriers having high inner side walls with said inner side walls having front and rear ends, a shaft mounted between the front ends of said inner side walls, said shaft adapted to pivotally support a lifting mast, a counterweight mounted on the rear ends of said side walls, an intermediate casing have a flange on the rear end thereof, said flange extending between and rigidly connected to the central portions of said inner side walls, means for mounting and supporting an engine on said intermediate casing flange, and an axle and transmission housing secured to the front end of said intermediate casing and extending laterally under the front ends of said inner side walls with said front ends resting upon said axle housing so as to be supported thereby.

References Cited by the Examiner

UNITED STATES PATENTS

| 1,773,587 | 8/30 | Lape | 180—66 |
|---|---|---|---|
| 2,368,121 | 1N45 | Dunham | 180—54 |
| 2,299,445 | 10/42 | Weaver | 180—54 |
| 2,368,121 | 1/45 | Dunham | 180—54 |
| 2,381,729 | 8/45 | Dunham et al. | 180—54 |
| 2,456,521 | 12/48 | Johnson | 180—54 |
| 2,471,429 | 5/49 | Hawkins | 180—54 |
| 2,477,789 | 8/49 | Dunham | 180—54 |

FOREIGN PATENTS 1,114,101  9/61  Germany.

HUGO O. SCHULTZ, *Primary Examiner.*

MORRIS TEMIN, *Examiner.*